(12) United States Patent
Blacher et al.

(10) Patent No.: US 11,087,296 B1
(45) Date of Patent: Aug. 10, 2021

(54) PROGRAMMATIC RECONCILIATION OF ELECTRONIC RECEIVABLES

(71) Applicant: Wells Fargo Bank, N.A., San Francisco, CA (US)

(72) Inventors: Seth M. Blacher, San Francisco, CA (US); Raymond Francis Gatland, Winston-Salem, NC (US); Irvin J. Cooper, Columbia Heights, MN (US); Karin L. Farnsworth, Glen Allen, VA (US); Kellie L. Thomas, St. Johns, FL (US); Derek D. Mohr, Cornelius, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 14 days.

(21) Appl. No.: 15/257,461

(22) Filed: Sep. 6, 2016

(51) Int. Cl.
*G06Q 20/10* (2012.01)
*G06F 16/9535* (2019.01)

(52) U.S. Cl.
CPC ....... *G06Q 20/102* (2013.01); *G06F 16/9535* (2019.01)

(58) Field of Classification Search
CPC .... G06Q 40/12; G06Q 30/04; G06Q 20/4016; G06Q 50/01; G06Q 20/108; G06Q 20/405; G06Q 20/102; G06Q 10/00; G06Q 20/10; H04L 67/306; G06F 16/9535

See application file for complete search history.

(56) References Cited

U.S. PATENT DOCUMENTS

| | | | |
|---|---|---|---|
| 6,016,482 | A | 1/2000 | Molinari et al. |
| 6,223,168 | B1 * | 4/2001 | McGurl ............... G06Q 20/02 705/39 |
| 6,882,983 | B2 | 4/2005 | Furphy et al. |
| 7,006,994 | B1 | 2/2006 | Campbell et al. |
| 7,181,420 | B2 | 2/2007 | Gonen-Friednian Editt et al. |

(Continued)

OTHER PUBLICATIONS

"Fiserv Partners with TOPS software to Improve Payment Processing for Property Managers", Business Wire; New York, Dec. 20, 2012, pp. 1-3. (Year: 2012).*

(Continued)

*Primary Examiner* — Mohammad Z Shaikh
(74) *Attorney, Agent, or Firm* — Schwegman Lundberg & Woessner, P.A.

(57) ABSTRACT

System and techniques for programmatic reconciliation of electronic receivables are described herein. An electronic payment remittance and an electronic payment may be received. At least one payer profile may be queried using at least one remittance identifier to obtain a remittance payer profile. The at least one payer profile data base may be queried using at least one payment identifier to obtain a payment payer profile. A referential link may be created between the electronic payment remittance and the electronic payment based on an identification that the remittance payer profile matches the payment payer profile and an identification that at least one remittance identifier matches at least one payment identifier. A payment file may be generated and transmitted based on the referential link, the payment file including an association between the electronic payment remittance, the electronic data, and the referential link. The payment file may be transmitted to a computer.

21 Claims, 4 Drawing Sheets

(56) References Cited

U.S. PATENT DOCUMENTS

| | | | | |
|---|---|---|---|---|
| 7,693,791 | B2* | 4/2010 | Hahn-Carlson | G06Q 20/10 705/40 |
| 7,725,335 | B1* | 5/2010 | Goodwin | G06Q 40/02 705/4 |
| 7,734,545 | B1 | 6/2010 | Fogliano et al. | |
| 7,792,688 | B2 | 9/2010 | Yanak et al. | |
| 7,792,746 | B2 | 9/2010 | Del Callar et al. | |
| 7,865,411 | B2* | 1/2011 | Stone | G06Q 10/087 705/27.1 |
| 7,865,413 | B2 | 1/2011 | Furphy et al. | |
| 7,925,551 | B2* | 4/2011 | Hahn-Carlson | G06Q 20/10 345/418 |
| 7,996,311 | B2* | 8/2011 | Garrison | G06Q 30/04 705/40 |
| 8,224,724 | B2 | 7/2012 | Dubey et al. | |
| 8,326,754 | B2 | 12/2012 | Bandych et al. | |
| 8,571,985 | B1* | 10/2013 | Grigg | G06Q 40/02 705/35 |
| 8,600,885 | B2 | 12/2013 | Hoffman | |
| 9,406,097 | B1* | 8/2016 | Piety | G06Q 50/24 |
| 9,449,312 | B1 | 9/2016 | Wilson et al. | |
| 9,659,284 | B1 | 5/2017 | Wilson et al. | |
| 9,734,490 | B1 | 8/2017 | Wilson et al. | |
| 9,740,900 | B1 | 8/2017 | Wilson et al. | |
| 9,978,068 | B2* | 5/2018 | Butterfield | G06Q 20/405 |
| 10,115,082 | B1 | 10/2018 | Wilson et al. | |
| 10,147,082 | B1 | 12/2018 | Wilson et al. | |
| 10,311,412 | B1 | 6/2019 | Josephs et al. | |
| 10,410,191 | B2 | 9/2019 | Ceribelli et al. | |
| 10,417,674 | B2 | 9/2019 | Ceribelli et al. | |
| 10,540,655 | B2 | 1/2020 | Chase et al. | |
| 10,891,605 | B1 | 1/2021 | Wilson et al. | |
| 2003/0158811 | A1* | 8/2003 | Sanders | G06Q 20/00 705/39 |
| 2004/0049457 | A1* | 3/2004 | Garrison | G06Q 20/04 705/40 |
| 2004/0064375 | A1* | 4/2004 | Randell | G06Q 30/04 705/30 |
| 2005/0060261 | A1* | 3/2005 | Remington | G06Q 20/10 705/40 |
| 2005/0182721 | A1* | 8/2005 | Weintraub | G06Q 20/102 705/40 |
| 2005/0240524 | A1* | 10/2005 | Van De Van | G06Q 20/102 705/40 |
| 2005/0240601 | A1* | 10/2005 | Lyons | G06Q 30/04 |
| 2006/0041487 | A1* | 2/2006 | Santalo | G06Q 20/102 705/30 |
| 2007/0127597 | A1* | 6/2007 | Ammer | G06F 16/26 375/324 |
| 2007/0265887 | A1* | 11/2007 | McLaughlin | G06Q 40/08 705/4 |
| 2007/0282743 | A1* | 12/2007 | Lovelett | G06Q 20/10 705/40 |
| 2008/0021822 | A1* | 1/2008 | Hinton | G06Q 10/10 705/40 |
| 2008/0109256 | A1* | 5/2008 | Christen | G06Q 10/10 705/2 |
| 2009/0083179 | A1* | 3/2009 | Gustave | G06Q 20/04 705/40 |
| 2009/0112658 | A1* | 4/2009 | Mullen | G06Q 20/10 705/39 |
| 2009/0112662 | A1* | 4/2009 | Mullen | G06Q 20/10 705/35 |
| 2009/0244600 | A1* | 10/2009 | Haycock | G06Q 20/102 358/1.15 |
| 2009/0326974 | A1 | 12/2009 | Tolan et al. | |
| 2011/0258004 | A1* | 10/2011 | Dean | G06Q 10/10 705/4 |
| 2012/0047112 | A1 | 2/2012 | Steffan | |
| 2013/0124414 | A1 | 5/2013 | Roach et al. | |
| 2014/0006297 | A1* | 1/2014 | Hogg | G06Q 10/101 705/319 |
| 2014/0222669 | A1* | 8/2014 | Novak | G06Q 20/14 705/40 |
| 2014/0244491 | A1 | 8/2014 | Eberle et al. | |
| 2014/0282977 | A1* | 9/2014 | Madhu | G06Q 50/265 726/7 |
| 2015/0081482 | A1* | 3/2015 | Brereton | G06Q 40/12 705/30 |
| 2015/0242456 | A1* | 8/2015 | Cannon | G06Q 10/101 707/608 |
| 2016/0104133 | A1* | 4/2016 | Davis | G06Q 20/10 705/39 |
| 2018/0349776 | A1 | 12/2018 | Raamadhurai, Sr. et al. | |
| 2019/0378183 | A1 | 12/2019 | Lowell et al. | |
| 2019/0392410 | A1 | 12/2019 | Ceribelli et al. | |
| 2020/0184281 | A1 | 6/2020 | Le et al. | |
| 2020/0265326 | A1 | 8/2020 | Shah et al. | |
| 2020/0265393 | A1 | 8/2020 | Shah et al. | |
| 2020/0265443 | A1 | 8/2020 | Shah et al. | |
| 2020/0410562 | A1 | 12/2020 | Balasubramanian et al. | |

OTHER PUBLICATIONS

"U.S. Appl. No. 14/876,182, Response filed Apr. 16, 2018 to Non Final Office Action dated Nov. 15, 2017", 11 pgs.

"U.S. Appl. No. 14/876,182, Non Final Office Action dated Nov. 15, 2017", 13 pgs.

U.S. Appl. No. 14/876,182, filed Oct. 6, 2015, Data Field Transaction Repair Interface.

"U.S. Appl. No. 14/876,182, Pre-Appeal Brief filed Feb. 11, 2019", 5 pgs.

"U.S. Appl. No. 14/876,182, Decision on Pre-Appeal Brief dated Mar. 26, 2019", 2 pgs.

"U.S. Appl. No. 14/876,182, Appeal Brief filed May 28, 2019", 17 pgs.

"U.S. Appl. No. 14/876,182, Non Final Office Action dated Oct. 25, 2019", 15 pgs.

"U.S. Appl. No. 15/695,343, Non Final Office Action dated Nov. 15, 2019", 12 pgs.

"U.S. Appl. No. 14/876,182, Examiner Interview Summary dated Apr. 6, 2020", 3 pgs.

"U.S. Appl. No. 15/695,343, Final Office Action dated Mar. 23, 2020", 15 pgs.

"U.S. Appl. No. 15/695,343, Response filed Feb. 18, 2020 to Non Final Office Action dated Nov. 15, 2019", 10 pgs.

"U.S. Appl. No. 14/876,182, Final Office Action dated Aug. 9, 2018", 13 pgs.

U.S. Appl. No. 15/695,343, filed Sep. 5, 2017, Programmatic Reconciliation of Electronic Receivables.

"U.S. Appl. No. 14/876,182, Examiner's Answer dated Apr. 23, 2021", 22 pgs.

"U.S. Appl. No. 14/876,182, Response filed Jun. 23, 2021 to Examiner's Answer dated Apr. 23, 2021", 10 pgs.

* cited by examiner

PROGRAMMATIC RECONCILIATION OF ELECTRONIC RECEIVABLES

TECHNICAL FIELD

Embodiments described herein generally relate to receivables reconciliation and more specifically, but without limitation to, programmatic reconciliation of electronic receivables.

BACKGROUND

Receivables reconciliation is generally concerned with matching an incoming check with an outstanding account receivable. For example, a manufacturer may submit a check to a supplier in payment of an outstanding materials invoice. An employee of the supplier will then match the incoming check to the outstanding invoice on the manufacturer's account. For example, the employee may match the check to the outstanding invoice based on an account number written in the memo line of the check and an account number on the outstanding invoice.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

The technical complexity of managing receivables has increased with the popularity of submitting payments electronically. Entities (e.g., businesses, individuals, etc.) may wish to submit payments electronically for a variety of reasons such as, for example, to decrease costs (e.g., eliminate postage, paper, etc.) and to decrease processing time (e.g., eliminate check transit time, etc.). An automated clearing house (ACH) may be able to process large volumes of credit and debit transactions in batches. An ACH payment may include a set of payment data such as a payment amount and identifiers such as an ACH company identifier (COPID).

Remittance advice may be sent with (or separate from) the electronic payment and may include a set of remittance data that may provide descriptive information about the payment. For example, the set of remittance information may provide identifiers such as an email address of the payer, a fax number of the payer, a payment amount, invoice numbers, invoice amounts, etc. The remittance advice may be used by the recipient to identify the context of the payment such as, for example, who the payment is from and what the payment is for. In some examples, a single electronic payment may include a plurality of remittances. For example, a corporate trade exchange (CTX) formatted ACH payment may include remittance data for nearly 10,000 corresponding payment remittances.

The payment information and remittance information may be reconciled or otherwise compared to match the payment to an outstanding receivable of the payee. However, errors may arise in the reconciliation process. For example, the amount of the payment may not match the amount due in the remittance data or the remittance data may be in a non-standard or unrecognized format.

The present subject matter addresses the technical problem of the complexity of reconciling electronic payments and handling exceptions (e.g., errors, etc.) by using by way of example and not limitation, a payer profile and a matching engine to programmatically reconcile receivables. The payer profile may include a variety of information for a payer that sends electronic payments through the electronic payment network. For example, the payer profile may include identifiers such as an ACH COID, and email address, and a fax number. The matching engine may match payment data and remittance data to the payer profile data to create an association between the payment and the remittance. The matched data may be transmitted as a payment data file to the payee.

The matching engine may use rules for determining how the payment data and the remittance data should be matched. A set of default rules may be used. In addition, the matching engine may use a set of rules customized for a particular payee. In an example, a user interface (e.g., a web portal, etc.) may be provided to the payee for creating and editing customized matching rules.

In addition, the user interface may be presented for the user to respond to exceptions in the reconciliation process. For example, a user interface may be presented to the user when a payment amount included in a remittance does not match the payment amount or the amount of the account receivable. The user may be presented with an option for manually matching the payment to a remittance and for matching the payment to a receivable (e.g., a partial payment, etc.).

In some examples, matching decisions made using the user interface may be used for matching future payments. For example, a payee may be presented with a user interface for matching a payment to a remittance where the remittance data is in an unrecognized format. The user may provide a field map or other information indicating the data fields in the unrecognized format that correspond with the data fields in a recognized format. The matching engine may then use the rule for processing future payments from the payer that are formatted in the previously unrecognizable format.

Figure 1:
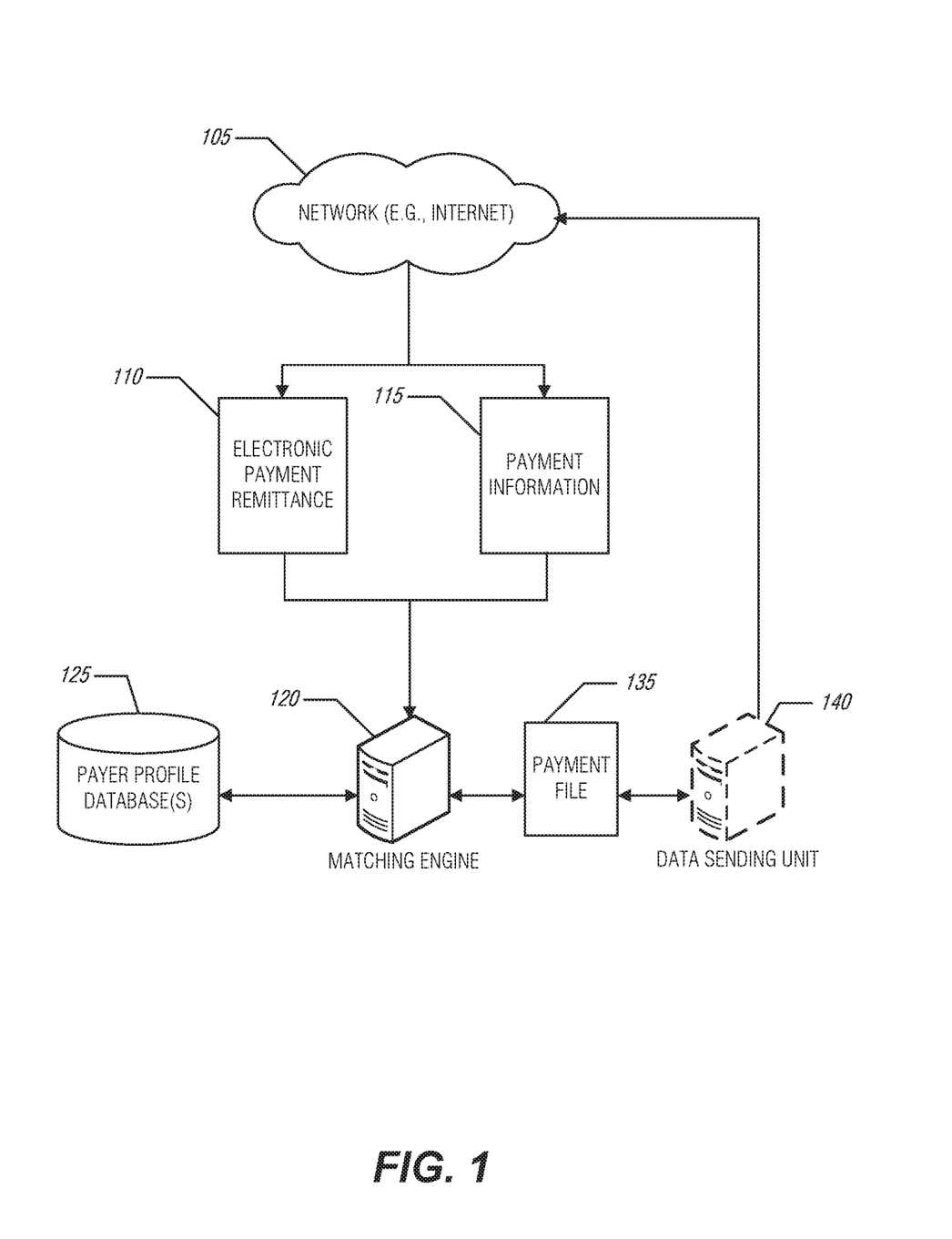
FIG. 1 is a block diagram illustrating an example of an environment for programmatic reconciliation of electronic receivables, according to various embodiments.

FIG. 1 is a block diagram illustrating an example of an environment 100 for programmatic reconciliation of electronic receivables, according to various embodiments. The environment may include a network (e.g., the internet, etc.) 105, an electronic payment remittance 110, payment information 115, a matching engine 120, one or more payer profile databases 125, a payment file 135, and a data sending unit 140.

The present subject matter may be implemented in various configurations. For example, the matching engine 120 and the one or more databases 125 may be implemented in different (or the same) computing systems (e.g., a single server, a collection of servers, a cloud-based computing platform, etc.). A computing system may comprise one or more processors (e.g., hardware processor 402 described in FIG. 4, etc.) that execute software instructions, such as those used to define a software or computer program, stored in a computer-readable storage medium such as a memory device (e.g., a main memory 404 and a static memory 406 as described in FIG. 4, a Flash memory, random access memory (RAM), or any other type of volatile or non-volatile memory that stores instructions), or a storage device (e.g., a disk drive, or an optical drive). Alternatively or additionally, the computing system may comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of the foregoing examples of dedicated hardware, for performing the techniques described in this disclosure.

Transactions between two entities (e.g., a buyer and a seller, etc.) may be made using electronic payments (e.g., automated clearing house (ACH), etc.). To initiate the payment, the payer may submit (e.g., through a financial institution with which the payer has an account, etc.) an electronic payment remittance 110 and payment information 115. The electronic payment remittance 110 may contain information that describes the payment such as, for example, a payment amount, an invoice number and amount, an email address for the payee, a fax number for the payee, etc. The electronic payment remittance 110 may provide context (e.g., what the payment is for, how much the payment is for, etc.) for the payment. The payee may use the remittance information to match a payment with an outstanding receivable (e.g., payment due, etc.). In some examples, the payment information 115 and the electronic payment remittance 110 may be transmitted together.

The payment information 115 may include information used for processing the payment (e.g., by a financial institution with which the payee has an account, etc.). The payment information 115 may include information items such as, for example, a payment amount, an ACH company identifier (ACH COID), financial account information (e.g., a customer identifier, etc.), etc.

The one or more payer profile databases 125 may contain information corresponding to entities making electronic payments. For example, ACME Company may have a profile stored in the database including information such as an ACH COID, and email address, a fax number, a financial institution identifier, etc. The one or more payer profile databases 125 may use a variety of data storage paradigms (e.g., relational, object-oriented, XML, etc.).

The matching engine 120 may include a variety of components (e.g., for example, as discussed in further detail below with respect to FIG. 2) that may be used to match the payment information 115 with the electronic payment remittance 110. The matching engine 120 may query the one or more payer profile databases 125 to identify a payer profile corresponding to the electronic payment remittance 110. Likewise, the matching engine 120 may query the one or more payer profile databases 125 to identify a payer profile matching the payment information 115.

A variety of search techniques may be employed to locate a payer profile using the query. For example, an email address of the payer may be extracted from the electronic payment remittance 110 and the email address may be submitted as a keyword search against a set of payer profiles contained in the one or more payer profile databases 125. An association may be created (e.g., stored in a database, added to the payer profile, etc.) between the electronic payment remittance 110 and the payer profile. The payment information 115 may be processed in a similar manner.

The electronic payment remittance 110 may be matched to the payment information 110 by identifying a shared identifier. The shared identifier may comprise a field in the electronic payment information. In some examples, a remittance may be received in a non-parsable form (e.g., images, some PDFs, etc.) and the remittance may be processed to extract (e.g., using optical character recognition (OCR), etc.) the electronic payment remittance 110. In an example, a numerical value in a payment amount field of the electronic payment remittance 110 may be matched with a numerical value in a payment field of the electronic payment information.

In some examples, the matching engine 120 may not find a match among the electronic payment remittance 110, the payment information 115, and a payer profile. For example, a payer profile may not exist that matches the electronic payment remittance 115. The matching engine 120 may generate and store a new payer profile in the one or more payer profile databases 125. Thus, the matching engine 120 may automatically (e.g., without human intervention) address the exception and prevent future exceptions resulting from a missing payer profile.

In some examples, the matching engine 120 may not find a shared identifier among the electronic payment remittance 110 and the payment information 115. The matching engine 120 may generate a set of response options that may be transmitted to a user interface allowing a user to select an option of the set of options to address the exception. For example, the electronic payment remittance 110 may have a different payment amount and/or payment identifier than the payment information 115 and an option may be presented to create a rule to correct the electronic payment remittance 115. In some examples, the matching engine 120 may store user responses as a set of rules (e.g., logical if/then relationships stored in a database that identify type(s) of exceptions and method(s) to address the exception). The matching engine 120 may then query the set of rules when an exception occurs. For example, a payment identifier mismatch rule may be created for remittances received from ACME Company and the rule may be used to automatically update the payment identifier in the remittance when received (or upon an exception). In some examples, an option may be transmitted to a user interface for display to a user that may allow the user to force a match between the electronic payment remittance 110 and the payment information 115. The matching engine 120 may use a variety of matching techniques to determine an association among the electronic payment remittance 110 and the payment information 115 such as, for example, keyword matching, pattern matching, etc.

The matching engine 120 may generate a payment file 135 that includes matched electronic payment remittance 110 and payment information 115. In some examples, the payment file 135 may include an association between the electronic payment remittance 110, the payment information 115, and a referential link that links identifies the relationship between the electronic payment remittance 110 and the payment information 115. The payment file 135 may be formatted such that it can be natively read by an enterprise resource planning application. In some examples, a graphical user interface may be provided to select an output option that may format the payment file 135 in one or more of a set of available formats. In some examples, a graphical user interface may be provided to customize the output of the payment file 135. In some examples, the payment file 135 may be transmitted to a graphical user interface for display. For example, the payment file 135 may be displayed in a webpage that provides a graphical representation of the payment file 135 and may include a selectable link for downloading a copy of the payment file 135.

The payment file 135 may be transmitted by a data sending unit 140. The data sending unit 140 may be a transceiver or other device capable of processing and transmitting output data. The data sending unit 140 may be implemented in hardware, software, or some combination of hardware and software. The data sending unit 140 may be implemented in the same computing system as one or more components of the matching engine 120 or may be implemented in one or more other computing systems. The data sending unit 140 may be communicatively coupled to a network (e.g., the internet, etc.) over which output such as the payment file 135 may be transmitted.

Figure 2:
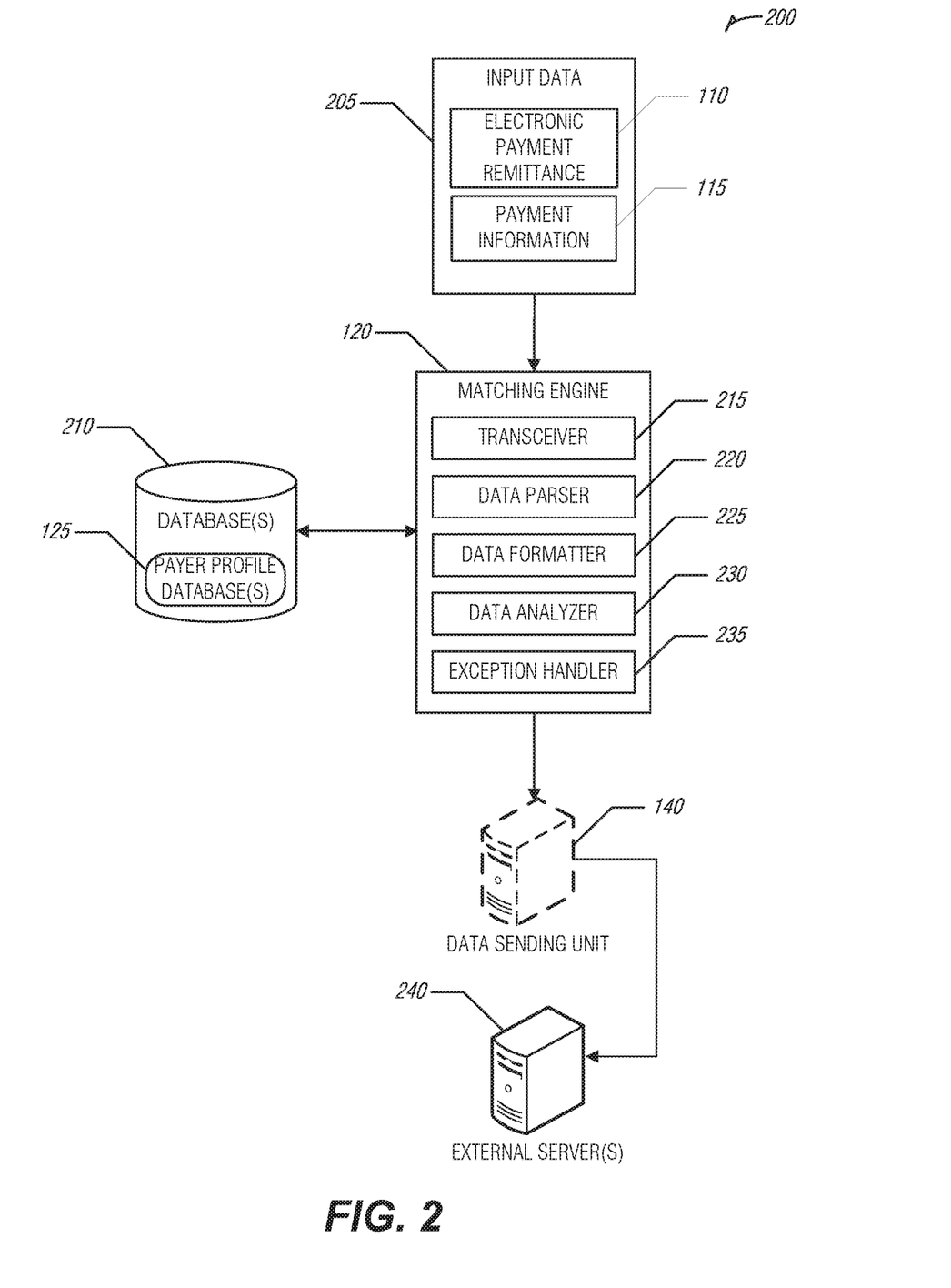
FIG. 2 is a block diagram illustrating an example of a system for programmatic reconciliation of electronic receivables, according to various embodiments.

FIG. 2 is a block diagram illustrating an example of a system 200 for programmatic reconciliation of electronic receivables, according to various embodiments. The system 200 may include input data 205, matching engine 120, one or more databases 210, data sending unit 140, and external servers 240.

The input data 205 may include a variety of inputs including data relating to electronic payments, electronic payment remittances, and receivables. In some examples, the input data 205 may include one or more files including open receivables (e.g., received from a payee of an electronic payment). In some examples, the input data 205 may include remittance advice from an online portal provided to a payer of an electronic payment. In some examples, the input data may include electronic payment remittance (e.g., the electronic payment remittance 110 as described in FIG. 1) and payment information (e.g., the payment information 115 as described in FIG. 1) received from a payer of an electronic payment.

The one or more databases 210 may include one or more payer profile databases (e.g., the one or more payer profile databases 125 as described in FIG. 1) and one or more rules databases. The rules databases may include a variety of data handling rules such as, for example, data formatting rules, data matching rules, etc. The rules may utilize a variety of algorithmic techniques for identifying, formatting, and matching datasets. For example, a rule may include a keyword matching algorithm that receives as an input a keyword from a field of a first dataset and returns as an output a set of datasets including the keyword. In some examples, a rule may include a pattern matching algorithm that receives as an input a data pattern (e.g., a set of fields, a set of data, file structure, etc.) and returns as output a set of datasets having a similar pattern.

The input data 205 may be transmitted to the matching engine 120 to find matches among payments and receivables. The matching engine 120 may include a transceiver 215, a data parser 220, a data formatter 225, a data analyzer 230, and an exception handler 235. The transceiver 215 may receive data sent to the matching engine 120 and transmit data sent out of the matching engine 120. For example, the transceiver 215 may receive the input data 205 (e.g., the electronic payment remittance 110, and the payment information 115 as described in FIG. 1, etc.) for processing by the matching engine 120. The transceiver 215 may transmit output data (e.g., the payment file 135 as described in FIG. 1, etc.) from the matching engine 120.

The data parser 220 may analyze the input data 205 to determine a data type (e.g., electronic payment remittance, payment information, receivable, etc.) and determine a corresponding data structure. The data parser 220 may identify data that is in an unrecognized format (e.g., electronic payment remittance in a non-standard format, etc.). In some examples, the data parser 220 may operate in conjunction with the data formatter 225. In some examples, the data formatter 225 may receive data that is incorrectly formatted and may apply a rule (e.g., retrieved from the one or more databases 210, etc.) to output the data in a standard format. For example, an electronic payment remittance may be received with an invoice number that contains more than an expected number of digits and the data formatter 225 may truncate (e.g., remove trailing or leading digits, etc.) the invoice number and output a new dataset including the truncated invoice number.

The data analyzer 230 may receive parsed data from a first dataset and may extract the contents of data fields or other information for use in matching the first dataset to other datasets. In some examples, the data analyzer 230 may reference one or more payer profile databases (e.g., the one or more payer profile databases 125 as described in FIG. 1) and may compare the extracted data with data corresponding to a payer profile to identify a payer profile matching the first dataset. For example, the first dataset may be an electronic payment remittance including an email address of a payer and the data analyzer 230 may identify that the electronic payment remittance matches a payer profile for ACME Company based on the payer profile including the same email address. The data analyzer 230 may similarly identify a matching payer profile for payment information, for example, by matching an ACH company ID in the payment information and the payer profile.

The data analyzer 230 may use a payer profile to identify matching electronic payment remittance and payment information. For example, the data analyzer 230 may determine that an electronic payment remittance matches payment information based on a payer profile shared among the electronic payment remittance and the payment information. For example, the electronic payment remittance may be determined to match the payment information because the electronic payment remittance and the payment information are associated with a payer profile for ACME Company.

The data analyzer 230 may use similar techniques to match electronic payment remittance and payment information to a receivable (e.g., an outstanding invoice, etc.). In some examples, the data analyzer 230 may combine the electronic payment remittance and the payment information into a single data record. For example, the data analyzer 230 may create a new data record for electronic payment remittance and payment information matched to a payer profile for ACME Company. In some examples, the data analyzer 230 may create a hierarchy of several records. In an example, a payment record may have several associated remittance and/or invoice records. The data records may be indexed in a various ways to increase retrieval efficiency of a computing device retrieving a record. For example, the data records may be indexed by an invoice number included in the data record.

The data analyzer 230 may receive parsed data, identified by the data parser 220 as a receivable, and may query the data records to identify a matching record. For example, the data analyzer 230 may have received an invoice number of 12345 and an amount due of $130,000 from the parsed data identified as a receivable and the data analyzer 230 may query the data records to identify a matching data record (e.g., payment) using the invoice number 12345 and a payment amount of $130,000.

In some examples, the data analyzer 230 may not identify a matching record. For example, a payer profile may not exist in a payer profile database with data matching data received in an electronic payment remittance or payment information. In some examples, the data analyzer 230 may use a payment amount as an input and the payment amount may not match another dataset. In such cases, the data analyzer 230 may operate in conjunction with the exception handler 235 to remediate issues identified during data processing.

The exception handler 235 may identify the cause of an exception (e.g., data mismatch, missing payer profile, etc.) and may automatically remediate the issue by referencing a set of rules (e.g., field mapping by data type, etc.) stored in the one or more databases 210. In some examples, the exception handler 235 may generate a graphical user interface to be transmitted to a display of a computing device (e.g., personal computer, mobile device, tablet, etc.) including selectable user interface objects which, upon selection, may create a rule or other instructions for the exception handler to use to remediate the issue. For example, the user may be presented with a table of data fields and their respective content for one or more datasets and the graphical user interface may receive input defining a custom data field map for the one or more datasets. In some examples, the received input may be stored in a rules database and may be used by the data analyzer 230 or the exception handler 235 in processing future data.

The data analyzer 230 may transmit output (e.g., using transceiver 215, etc.) to the data sending unit 140. The data sending unit 140 may be communicatively coupled to a computer network (e.g., the internet, etc.) and may be configured to communicate with one or more external servers 240. For example, the data sending unit 140 may use an application programmer interface (API) to communicate with an electronic resource planning server or may interface with a web server hosting a web portal (e.g., a specially designed website for displaying data from different sources, etc.) for managing payments and receivables. The data sending unit 140 may be implemented in the same computing system as one or more components of the matching engine 120 or may be implemented in one or more other computing systems.

In some examples, the matching engine 120 may receive (e.g., using the transceiver 215) an electronic payment remittance (e.g., included in the input data 205) including a set of remittance data (e.g., a set of fields containing data about the electronic payment remittance such as one or more remittance identifiers). For example, the set of remittance data may include an email address of a payer, a payment amount, an invoice number(s), etc. In an example, the electronic payment remittance may be parsed by the data parser 220 to extract the set of remittance data. In an example, the data parser 220 may determine that the set of remittance data is encoded in a first format and the data parser 220 may work in conjunction with the data formatter 225 to encode the set of remittance data in a second format.

In an example, the set of remittance data may be provided to the data analyzer 230. The data analyzer 230 may query at least one payer profile database (e.g., included in the one or more databases 210) using at least one remittance identifier (e.g., an email address identified by the data parser 220, etc.) included in the set of remittance data. The data analyzer 230 may select a remittance payer profile from the at least one payer profile database based on the query. In some examples, it may be determined by the data analyzer 230 that the at least one remittance identifier included in the remittance data does not match at least one payer profile in the at least one payer database. In response, the data analyzer 230 may work in conjunction with the exception handler 235 to automatically generate a new payer profile using the at least one remittance identifier included in the remittance data and may store the new payer profile in the at least one payer profile database.

The matching engine 120 may receive (e.g., using the transceiver 215) an electronic payment (e.g., included in the input data 205) including a set of payment data (e.g., a set of fields containing data about the electronic payment such as one or more payment identifiers). For example, the set of payment data may include a payment amount, ACH Company ID, etc. In an example, the electronic payment may be parsed by the data parser 220 to extract the set of payment data.

In an example, the set of payment data may be provided to the data analyzer 230. The data analyzer 230 may query the at least one payer profile database using at least one payment identifier (e.g., an ACH Company ID identified by the data parser 220, etc.) included in the set of payment data. The data analyzer 230 may select a payment payer profile from the at least one payer profile database based on the query.

A referential link may be created between the electronic payment remittance and the electronic payment based on the data analyzer 230 identifying that the remittance payer profile matches the payment payer profile and at least one remittance identifier included in the remittance data matches at least one payment identifier included in the set of payment data. For example, a referential link may be created when the data analyzer 230 selected ACME Company as the remittance payer profile and ACME Company as the payment payer profile and the set of remittance data and the set of payment data includes a payment amount of $130,000.

In an example, there may be a single payer profile containing payment identifiers and remittance identifiers. An identifier in the payment may be matched to a payment identifier in the payer profile and an identifier in the remittance may be matched to one of the remittance identifiers in the payer profile. In addition, the amount of the payment may be matched to a total amount indicated in the remittance data. Any optional matching fields selected in the payer profile may also be matched in order for an automated match to occur.

In some examples, the data analyzer 230 may determine that the at least one remittance identifier included in the set of remittance data does not match the at least one payment identifier included in the set of payment data. In response, the data analyzer 230 may operate in conjunction with the exception handler 235 to generate a graphical user interface including the set of remittance data and the set of payment data. The graphical user interface may be transmitted over a computer network (e.g., using the transceiver 215 and the data sending unit 140, etc.). In an example, the graphical user interface may include a set of selectable user interface elements (e.g., dropdown boxes, radio boxes, drag and drop areas, etc.). In an example, a set of user inputs corresponding to the set of selectable user interface elements may be received and the referential link may be created using the received set of user inputs.

In some examples, unmatched payments and payments without any remittance information may be included in the file sent to the customer. In some examples, a payer and/or payment may not have a payer profile. Payer profiles may be used for matching remittance information and payment data. In some cases, a payment may be processed without matching the remittance data with the payment data; in such a case, a payer profile may not be needed to complete processing.

In an example, the identification that at least one remittance identifier included in the set of remittance data matches at least one payment identifier included in the set of payment data may include comparing the at least one remittance identifier and the at least one payment identifier to a set of rules included in a rules database (e.g., included in the one or more databases 210).

The data analyzer 230 may generate a payment file based on the referential link. In an example, the payment file may include an association between the electronic payment remittance, the electronic payment data, and the referential link. For example, the payment file may include the electronic payment remittance, the electronic payment data, and the relationship between them as indicated by the referential link. The payment file may be transmitted over a computer network (e.g., using the transceiver 215 and the data sending unit 140) to an external server (e.g., a web server, an electronic resource planning server, etc.).

The present subject matter may be implemented in various configurations. For example, the matching engine 120, the transceiver 215, data parser 220, data formatter 225, data analyzer 230, exception handler 235, data sending unit 140, and the one or more databases 210 may be implemented in different (or the same) computing systems (e.g., a single server, a collection of servers, a cloud-based computing platform, etc.).

Figure 3:
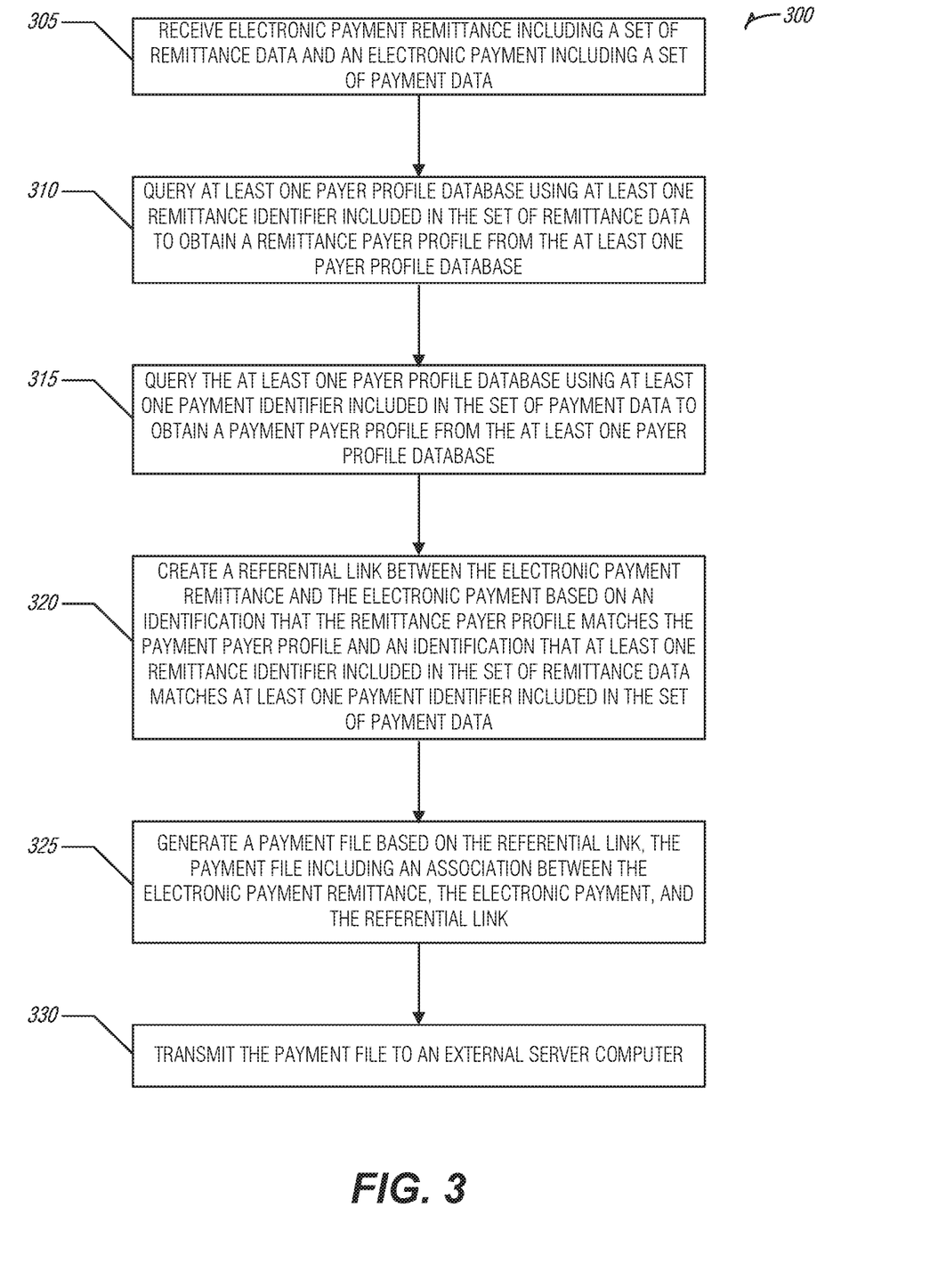
FIG. 3 is a flow diagram illustrating an example of a method for programmatic reconciliation of electronic receivables, according to various embodiments.

FIG. 3 is a flow diagram illustrating an example of a method 300 for programmatic reconciliation of electronic receivables, according to various embodiments. The method 300 may include similar components and functions as described in FIG. 2. The method 300 may be used to process a set of input data including for example, an electronic payment remittance, an electronic payment, and a receivables file.

At operation 305, an electronic payment remittance and an electronic payment may be received over a computer network by a matching engine (e.g., the matching engine 120 as described in FIG. 2.). The electronic payment may include a set of payment data (e.g., a set of data fields and corresponding data describing the electronic payment, etc.). For example, the set of payment data may include a payment amount, ACH Company ID, etc. The electronic payment remittance may include a set of remittance data (e.g., a set of data fields and corresponding data extracted by the data parser 220 as described in FIG. 2, etc.). For example, the set of remittance data may include an email address of a payer, a payment amount, an invoice number(s), invoice amount (s), etc. In an example, it may be determined (e.g., by the data parser 220 as described in FIG. 2.) that the set of remittance data is encoded in a first format and the set of remittance data may be encoded in a second format (e.g., using the data parser 220 as described in FIG. 2 in conjunction with the data formatter 225 as described in FIG. 2).

At operation 310, at least one payer profile database (e.g., the at least one database 210 as described in FIG. 2, etc.) may be queried by the matching engine using at least one remittance identifier (e.g., an email address, etc.) included in the set of remittance data to obtain a remittance payer profile from the at least one payer profile database. For example, the data analyzer 230 as described in FIG. 2 may query the at least one payer profile database to determine if a payer profile including the email address exists. For example, the query may include a remittance identifier including an email address acctspayable@acmeco.com and a payer profile for ACME Company may be selected that includes the email address acctspayable@acmeco.com.

In some examples, it may be determined (e.g., by the data analyzer 230 as described in FIG. 2) that the at least one remittance identifier included in the remittance data does not match at least one payer profile in the at least one payer database. In response, a new payer profile may be automatically generated (e.g., using the data analyzer 230 as described in FIG. 2 in conjunction with the exception handler 235 as described in FIG. 2) using the at least one remittance identifier included in the remittance data and the new payer profile may be stored in the at least one payer profile database. For example, the email address acctspayable@acmeco.com may not match a payer profile in the at least one payer profile database and a new profile may be created for ACME Company using the email address acctspayable@acmeco.com. In some examples, additional data items from the set of remittance data may be used in creating the new profile such as for example, a company name, a fax number, etc.

At operation 315, the at least one payer profile database may be queried by the matching engine (e.g., by the data analyzer 230 as described in FIG. 2, etc.) using at least one payment identifier included in the set of payment data to obtain a payment payer profile from the at least one payer profile database. For example, the set of payment data may include a payment identifier of an ACH Company ID and the at least one payer profile database may be queried using the ACH Company ID. For example, the query may include ACH Company ID 9876543210 and a payer profile for ACME Company may be selected because it includes ACH Company ID 9876543210.

At operation 320, a referential link may be created between the electronic payment remittance and the electronic payment based on an identification that the remittance payer profile matches the payment payer profile and at least one remittance identifier included in the set of remittance data matches at least one payment identifier included in the set of payment data. For example, a referential link may be created when the data analyzer 230 selected ACME Company as the remittance payer profile and ACME Company as the payment payer profile and the set of remittance data and the set of payment data includes a payment amount of $130,000. A variety of techniques may be used to create the referential link such as, for example, adding respective reference fields to each of the set of remittance data and the payment data, creating a merged data file including a self-referential field indicating respective fields belonging to the set of remittance data and the set of payment data, creating a reference field in the matched payer profile indicating the referential link between the set of remittance data and the set of payment data, etc.

In some examples, it may be determined (e.g., by the data analyzer 230 as described in FIG. 2) that the at least one remittance identifier included in the set of remittance data does not match the at least one payment identifier included in the set of payment data. In response, a graphical user interface may be generated (e.g., by the data analyzer 230 as described in FIG. 2 in conjunction with the exception handler 235 as described in FIG. 2) including the set of remittance data and the set of payment data. The graphical user interface may be transmitted over a computer network (e.g., using the transceiver 215 and the data sending unit 140, etc.). In an example, the graphical user interface may include a set of selectable user interface elements (e.g., dropdown boxes, radio boxes, drag and drop areas, textboxes, etc.). In an example, a set of user inputs corresponding to the set of selectable user interface elements may be received and the referential link may be created using the received set of user inputs.

At operation 325, a payment file may be generated by the matching engine based on the referential link. The payment file may include an association between the electronic payment remittance, the electronic payment, and the referential link. In an example, the payment file may include a record including an invoice number and amount due from the set of receivables data and an indication of the linked set of remittance data and set of payment data to which the invoice number and amount due were matched. For example, the set of remittance data may include an invoice number of 12345 and an invoice amount due of $130,000. In the example, the payment file may be generated based on the matching engine identifying that the referentially linked set of remittance data and set of payment data includes an invoice number of 12345 and a payment amount of $130,000.

At operation 330, the payment file may be transmitted over a computer network to an external server computer. For example, the payment file may be transmitted to a webserver for display in a graphical user interface. In another example, the payment file may be transmitted to an electronic resource planning server for further processing.

Figure 4:
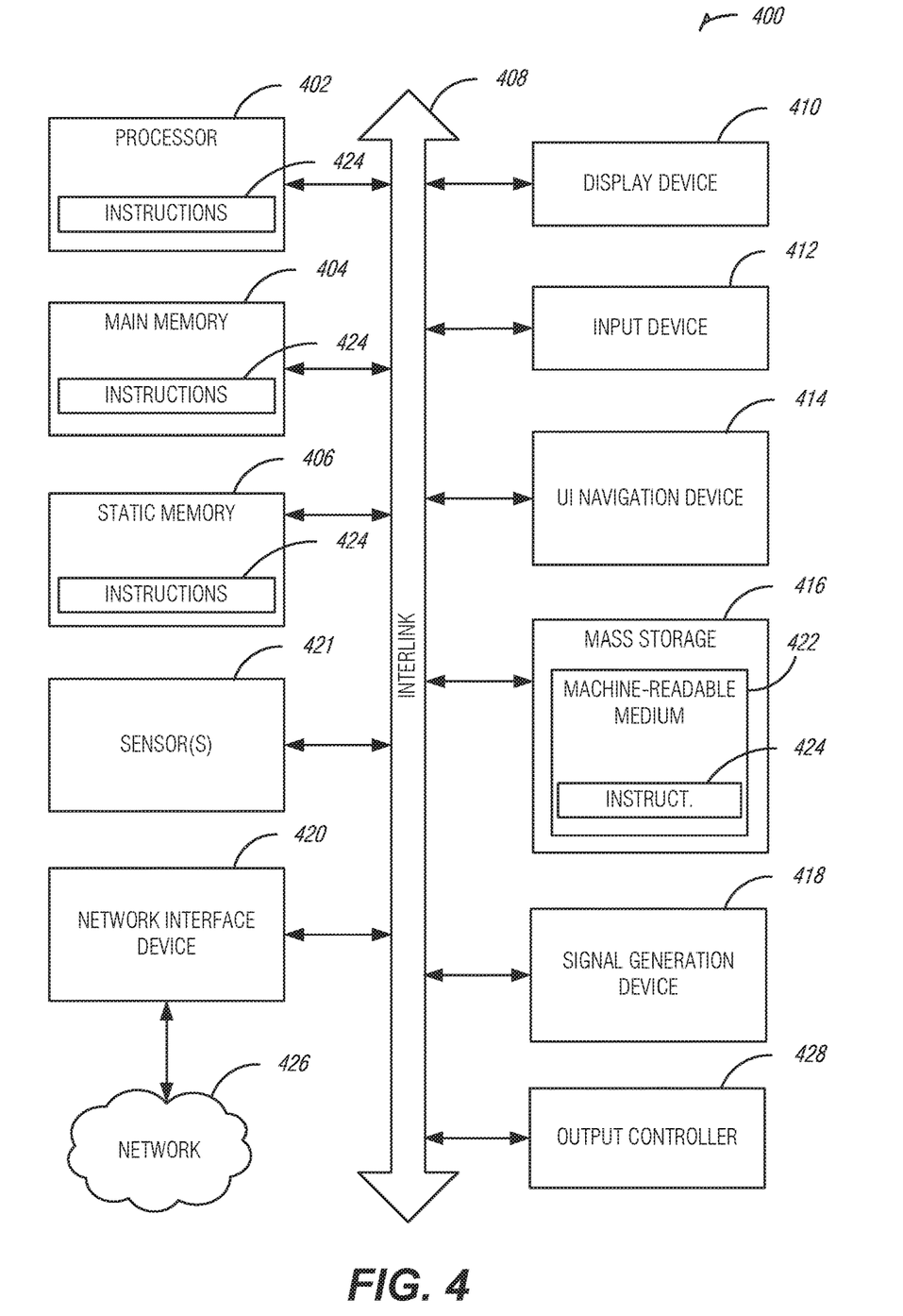
FIG. 4 is a block diagram illustrating an example of a machine upon which one or more embodiments may be implemented.

FIG. 4 is a block diagram illustrating an example machine 400 upon which any one or more of the techniques (e.g., methodologies) discussed herein may perform. In alternative embodiments, the machine 400 may operate as a standalone device or may be connected (e.g., networked) to other machines. In a networked deployment, the machine 400 may operate in the capacity of a server machine, a client machine, or both in server-client network environments. In an example, the machine 400 may act as a peer machine in peer-to-peer (P2P) (or other distributed) network environment. The machine 400 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuit sets are a collection of circuits implemented in tangible entities that include hardware (e.g., simple circuits, gates, logic, etc.). Circuit set membership may be flexible over time and underlying hardware variability. Circuit sets include members that may, alone or in combination, perform specified operations when operating. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

Machine (e.g., computer system) 400 may include a hardware processor 402 (e.g., a central processing unit (CPU), a graphics processing unit (GPU), a hardware processor core, or any combination thereof), a main memory 404 and a static memory 406, some or all of which may communicate with each other via an interlink (e.g., bus) 408. The machine 400 may further include a display unit 410, an alphanumeric input device 412 (e.g., a keyboard), and a user interface (UI) navigation device 414 (e.g., a mouse). In an example, the display unit 410, input device 412 and UI navigation device 414 may be a touch screen display. The machine 400 may additionally include a storage device (e.g., drive unit) 416, a signal generation device 418 (e.g., a speaker), a network interface device 420, and one or more sensors 421, such as a global positioning system (GPS) sensor, compass, accelerometer, or other sensor. The machine 400 may include an output controller 428, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 416 may include a machine readable medium 422 on which is stored one or more sets of data structures or instructions 424 (e.g., software) embodying or utilized by any one or more of the techniques or functions described herein. The instructions 424 may also reside, completely or at least partially, within the main memory 404, within static memory 406, or within the hardware processor 402 during execution thereof by the machine 400. In an example, one or any combination of the hardware processor 402, the main memory 404, the static memory 406, or the storage device 416 may constitute machine readable media.

While the machine readable medium 422 is illustrated as a single medium, the term "machine readable medium" may include a single medium or multiple media (e.g., a centralized or distributed database, and/or associated caches and servers) configured to store the one or more instructions 424.

The term "machine readable medium" may include any medium that is capable of storing, encoding, or carrying instructions for execution by the machine 400 and that cause the machine 400 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine readable medium with a plurality of particles having invariant (e.g., rest) mass. Accordingly, massed machine-readable media are not transitory propagating signals. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 424 may further be transmitted or received over a communications network 426 using a transmission medium via the network interface device 420 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 420 may include one or more physical jacks (e.g., Ethernet, coaxial, or phone jacks) or one or more antennas to connect to the communications network 426. In an example, the network interface device 420 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 400, and includes digital or analog communications signals or other intangible medium to facilitate communication of such software.

ADDITIONAL NOTES & EXAMPLES

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A system for programmatic reconciliation of electronic receivables, the system comprising:
    at least one payer profile database;
    at least one transceiver;
    at least one processor; and
    at least one memory including instructions that, when executed by the at least one processor, cause the at least one processor to:
        receive, over a computer network using the at least one transceiver, an electronic payment remittance and an electronic payment, the electronic payment remittance including a set of remittance data, and the electronic payment including a set of payment data;
        query the at least one payer profile database using at least one remittance identifier included in the set of remittance data to obtain a remittance payer profile from the at least one payer profile database;
        query the at least one payer profile database using at least one payment identifier included in the set of payment data to obtain a payment payer profile from the at least one payer profile database;
        create a referential link between the electronic payment remittance and the electronic payment based on an identification that the remittance payer profile matches the payment payer profile and an identification that at least one remittance identifier included in the set of remittance data matches at least one payment identifier included in the set of payment data;
        identify an unexpected value in a data field of the electronic payment remittance;
        determine a set of exception handling rules for the unexpected value using stored user responses for a prior exception corresponding to the data field, wherein the set of exception handling rules includes a field map that defines field translations between unrecognized data field formats and recognized data field formats;

update the data field using the set of exception handling rules, the using of the set of exception handling rules including using the field map;

generate a payment file based on the referential link, the payment file including an association between the electronic payment remittance, the electronic payment, the updated data field, and the referential link; and transmit the payment file, over a computer network using the at least one transceiver, to an external server computer.

2. The system of claim 1, the instructions further comprising instructions that cause the at least one processor to:

determine that the set of remittance data is encoded in a first format; and encode the set of remittance data in a second format based on the determining.

3. The system of claim 1, the instructions further comprising instructions that cause the at least one processor to:

determine that the at least one remittance identifier included in the remittance data does not match at least one payer profile in the at least one payer profile database;

generate a new payer profile using the at least one remittance identifier included in the remittance data; and store the new payer profile in the at least one payer profile database.

4. The system of claim 1, the instructions further comprising instructions that cause the at least one processor to:

determine that the at least one remittance identifier included in the set of remittance data does not match the at least one payment identifier included in the set of payment data;

generate a graphical user interface including the set of remittance data and the set of payment data; and transmit, over a computer network, the graphical user interface.

5. The system of claim 4, wherein the graphical user interface includes a set of selectable user interface elements.

6. The system of claim 5, the instructions further comprising instructions that cause the at least one processor to:

receive a set of user inputs corresponding to the set of selectable user interface elements; and create the referential link using the received set of user inputs.

7. The system of claim 1, wherein the identification that at least one remittance identifier included in the set of remittance data matches at least one payment identifier included in the set of payment data includes comparing the at least one remittance identifier and the at least one payment identifier to a set of matching rules included in a rules database.

8. At least one non-transitory machine readable medium including a set of instructions for programmatic reconciliation of electronic receivables that, when executed by a machine, cause the machine to:

receive, over a computer network, an electronic payment remittance and an electronic payment, the electronic payment remittance including a set of remittance data, and the electronic payment including a set of payment data;

query at least one payer profile database using at least one remittance identifier included in the set of remittance data to obtain a remittance payer profile from the at least one payer profile database;

query the at least one payer profile database using at least one payment identifier included in the set of payment data to obtain a payment payer profile from the at least one payer profile database;

create a referential link between the electronic payment remittance and the electronic payment based on an identification that the remittance payer profile matches the payment payer profile and an identification that at least one remittance identifier included in the set of remittance data matches at least one payment identifier included in the set of payment data;

identify an unexpected value in a data field of the electronic payment remittance;

determine a set of exception handling rules for the unexpected value using stored user responses for a prior exception corresponding to the data field, wherein the set of exception handling rules includes a field map that defines field translations between unrecognized data field formats and recognized data field formats;

update the data field using the set of exception handling rules, the using of the set of exception handling rules including using the field map;

generate a payment file based on the referential link, the payment file including an association between the electronic payment remittance, the electronic payment, the updated data field, and the referential link; and transmit the payment file, over a computer network, to an external server computer.

9. The non-transitory machine readable medium of claim 8, the set of instructions further including instructions that, when executed by the machine, cause the machine to:

determine that the set of remittance data is encoded in a first format; and encode the set of remittance data in a second format based on the determining.

10. The non-transitory machine readable medium of claim 8, the set of instructions further including instructions that, when executed by the machine, cause the machine to:

determine that the at least one remittance identifier included in the remittance data does not match at least one payer profile in the at least one payer profile database;

generate a new payer profile using the at least one remittance identifier included in the remittance data; and store the new payer profile in the at least one payer profile database.

11. The non-transitory machine readable medium of claim 8, the set of instructions further including instructions that, when executed by the machine, cause the machine to:

determine that the at least one remittance identifier included in the set of remittance data does not match the at least one payment identifier included in the set of payment data;

generate a graphical user interface including the set of remittance data and the set of payment data; and transmit, over a computer network, the graphical user interface.

12. The non-transitory machine readable medium of claim 11, wherein the graphical user interface includes a set of selectable user interface elements.

13. The non-transitory machine readable medium of claim 12, the set of instructions further including instructions that, when executed by the machine, cause the machine to:

receive a set of user inputs corresponding to the set of selectable user interface elements; and create the referential link using the received set of user inputs.

14. The non-transitory machine readable medium of claim 8, wherein the identification that at least one remittance identifier included in the set of remittance data matches at least one payment identifier included in the set of payment data includes comparing the at least one remittance identifier and the at least one payment identifier to a set of matching rules included in a rules database.

15. A method for programmatic reconciliation of electronic receivables, the method comprising:

receiving, over a computer network, an electronic payment remittance and an electronic payment, the electronic payment remittance including a set of remittance data, and the electronic payment including a set of payment data;

querying, using one or more processors, at least one payer profile database using at least one remittance identifier included in the set of remittance data to obtain a remittance payer profile from the at least one payer profile database;

querying, using one or more processors, the at least one payer profile database using at least one payment identifier included in the set of payment data to obtain a payment payer profile from the at least one payer profile database;

creating, using one or more processors, a referential link between the electronic payment remittance and the electronic payment based on an identification that the remittance payer profile matches the payment payer profile and an identification that at least one remittance identifier included in the set of remittance data matches at least one payment identifier included in the set of payment data;

identifying an unexpected value in a data field of the electronic payment remittance;

determining a set of exception handling rules for the unexpected value using stored user responses for a prior exception corresponding to the data field, wherein the set of exception handling rules includes a field map that defines field translations between unrecognized data field formats and recognized data field formats;

updating the data field using the set of exception handling rules, the using of the set of exception handling rules including using the field map;

generating, using one or more processors, a payment file based on the referential link, the payment file including an association between the electronic payment remittance, the updated data field, the electronic payment, and the referential link; and transmitting the payment file, over a computer network, to an external server computer.

16. The method of claim 15, further comprising:

determining, using one or more processors, that the set of remittance data is encoded in a first format; and encoding the set of remittance data in a second format based on the determining.

17. The method of claim 15, further comprising:

determining, using one or more processors, that the at least one remittance identifier included in the remittance data does not match at least one payer profile in the at least one payer profile database;

generating, using one or more processors, a new payer profile using the at least one remittance identifier included in the remittance data; and storing the new payer profile in the at least one payer profile database.

18. The method of claim 15, further comprising:

determining, using one or more processors, that the at least one remittance identifier included in the set of remittance data does not match the at least one payment identifier included in the set of payment data;

generating, using one or more processors, a graphical user interface including the set of remittance data and the set of payment data; and transmitting, over a computer network, the graphical user interface.

19. The method of claim 18, wherein the graphical user interface includes a set of selectable user interface elements.

20. The method of claim 19, further comprising:

receiving, over a computer network, a set of user inputs corresponding to the set of selectable user interface elements; and creating, using one or more processors, the referential link using the received set of user inputs.

21. The method of claim 15, wherein the identification that at least one remittance identifier included in the set of remittance data matches at least one payment identifier included in the set of payment data includes comparing the at least one remittance identifier and the at least one payment identifier to a set of matching rules included in a rules database.

* * * * *